US011970224B2

(12) United States Patent
Gross et al.

(10) Patent No.: US 11,970,224 B2
(45) Date of Patent: Apr. 30, 2024

(54) SHOE TRIMMING TOOL

(71) Applicant: Joy Global Surface Mining Inc, Milwaukee, WI (US)

(72) Inventors: Matthew L. Gross, West Allis, WI (US); James M. Hutsick, Mount Pleasant, WI (US); Joseph J. Wirkus, West Bend, WI (US); Josh Severson, Wauwatosa, WI (US); Ethan Pedretti, Holmen, WI (US); James Popp, Oak Creek, WI (US)

(73) Assignee: JOY GLOBAL SURFACE MINING INC, Milwaukee, WI (US)

( * ) Notice: Subject to any disclaimer, the term of this patent is extended or adjusted under 35 U.S.C. 154(b) by 578 days.

(21) Appl. No.: 17/119,017

(22) Filed: Dec. 11, 2020

(65) Prior Publication Data

US 2021/0179209 A1 Jun. 17, 2021

Related U.S. Application Data

(60) Provisional application No. 62/947,109, filed on Dec. 12, 2019.

(51) Int. Cl.
*B62D 55/088* (2006.01)
*B62D 55/08* (2006.01)

(52) U.S. Cl.
CPC ......... *B62D 55/0882* (2013.01); *B62D 55/08* (2013.01)

(58) Field of Classification Search
CPC .................... B62D 55/0882; B62D 55/08
See application file for complete search history.

(56) References Cited

U.S. PATENT DOCUMENTS

| 5,725,292 | A | 3/1998 | Keedy et al. | |
| 6,929,335 | B2* | 8/2005 | Colwell | B62D 55/14 |
| | | | | 305/201 |
| 7,210,750 | B2 | 5/2007 | Yamamoto et al. | |
| 9,446,805 | B2* | 9/2016 | Ellmann | B62D 55/125 |
| 2014/0346856 | A1* | 11/2014 | Colwell | B62D 55/12 |
| | | | | 305/185 |

FOREIGN PATENT DOCUMENTS

| CA | 2508741 A1 | 11/2006 |
| CL | 200003054 | 11/2000 |
| CL | 200201488 | 7/2001 |

OTHER PUBLICATIONS

Chilean Patent Office Action for Application No. 202003231 dated Jul. 12, 2022 (14 pages, including an English Statement of Relevance).

* cited by examiner

Primary Examiner — Jason R Bellinger
(74) Attorney, Agent, or Firm — Husch Blackwell LLP

(57) ABSTRACT

A mining machine includes a frame having a guide rail, the guide rail having a central portion. The mining machine also includes a shoe having a recessed area that defines a roller path, the shoe further having a drive lug, wherein the central portion of the guide rail is configured to be disposed within the recessed area. The mining machine also includes a cutting tool coupled to the frame and positioned such that the cutting tool is configured to abrasively remove material from the drive lug as the drive lug passes by the cutting tool.

30 Claims, 13 Drawing Sheets

SHOE TRIMMING TOOL

CROSS-REFERENCE TO RELATED APPLICATIONS

This application claims priority to U.S. Provisional Application No. 62/947,109, filed Dec. 12, 2019, the entire contents of each of which are incorporated herein by reference.

FIELD

The present disclosure relates to a mining machine, and more specifically to a mining shovel that utilizes a roller track or belt with shoes having lugs.

BACKGROUND

The weight of a mining shovel and traveling from location to location progressively compresses (e.g., crushes) and wears the shoes of a roller track or belt as the mining shovel is used. As the roller track is compressed and worn, a clearance between drive lugs on the shoes and a frame of the mining machine is reduced. Over time, the drive lugs will begin to unintentionally contact and interfere with the frame and/or a lower roller hub limiting the life and/or requiring time consuming maintenance.

To prevent or stop the drive lugs from prematurely contacting the frame and/or the lower roller hub, the drive lugs are trimmed so that space between the drive lugs and the frame is once again present. Trimming the drive lugs is a time consuming process, and creates excessive down time for the mining shovel when the shovel is unable to perform work.

SUMMARY

In accordance with one construction, a mining machine includes a frame having a guide rail, the guide rail having a central portion. The mining machine also includes a shoe having a recessed area that defines a roller path, the shoe further having a drive lug, wherein the central portion of the guide rail is configured to be disposed within the recessed area. The mining machine also includes a cutting tool coupled to the frame and positioned such that the cutting tool is configured to abrasively remove material from the drive lug as the drive lug passes by the cutting tool.

In accordance with one construction, a guide rail for a frame of a mining machine includes a central portion, a side portion extending from the central portion, and a cutting tool coupled to the side portion. The cutting tool is configured to abrasively remove material from a drive lug of a shoe as the shoe moves along the guide rail.

In accordance with one construction, a cutting tool is configured to be coupled to a frame of a mining machine. The cutting tool includes a surface configured to abrasively remove material from a drive lug of a shoe as the shoe moves along frame.

Other constructions and aspects of various constructions will become apparent by consideration of the detailed description and accompanying drawings.

BRIEF DESCRIPTION OF THE DRAWINGS

FIG. 7b is an enlarged view of the guide rail and shoe of FIG. 7a.
FIG. 8b is an enlarged view of the guide rail and shoe of FIG. 8a.
FIG. 9b is an enlarged view of the guide rail and shoe of FIG. 9a.

Before any constructions are explained in detail, it is to be understood that constructions are not limited in their application to the details of construction and the arrangement of components set forth in the following description or illustrated in the following drawings. Other constructions are possible and constructions described and illustrated are capable of being practiced or of being carried out in various ways.

DETAILED DESCRIPTION

Figure 1:
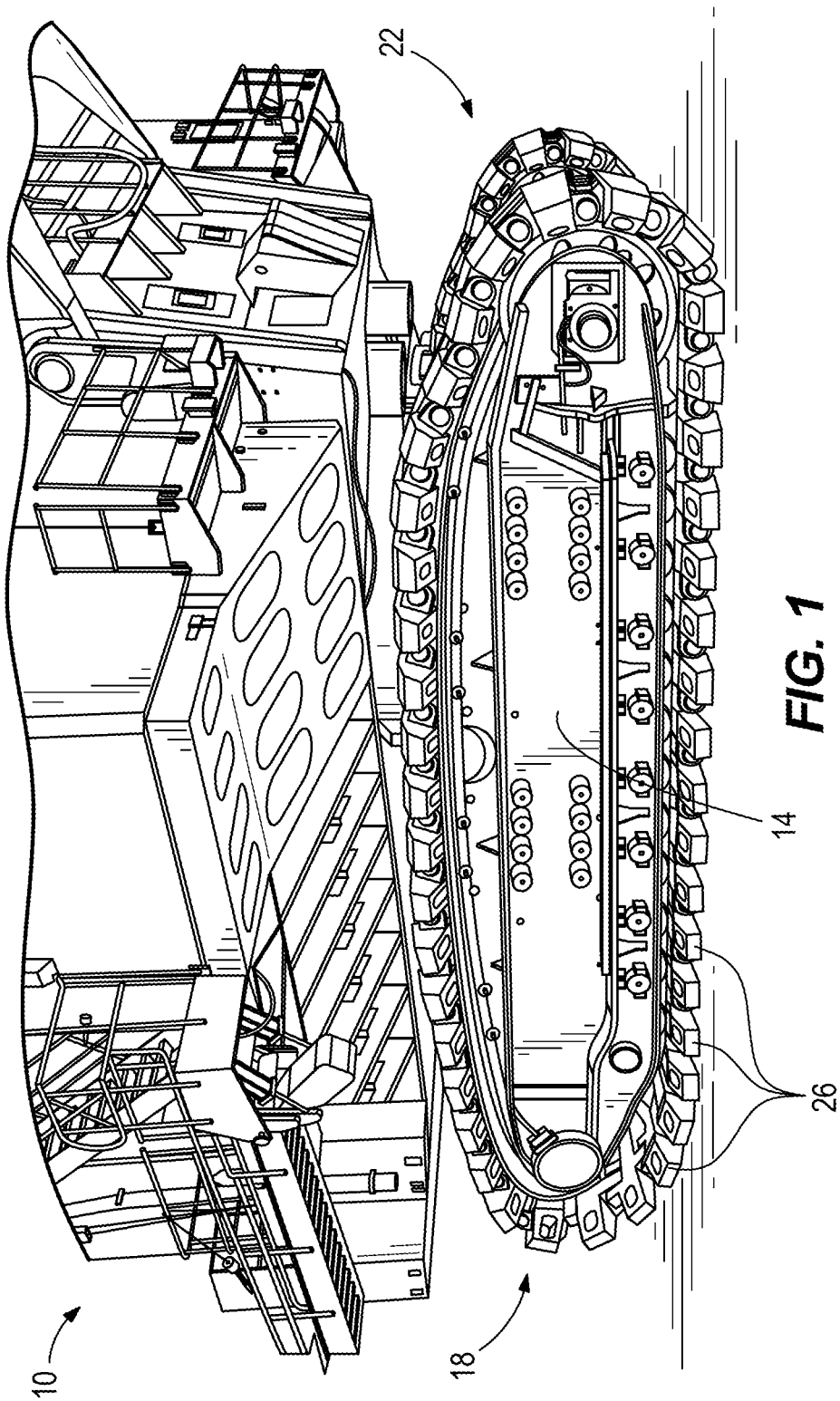
FIG. 1 is a perspective view of a mining machine.

FIG. 1 illustrates a mining machine 10 that includes a prime mover (not shown), which propels the mining machine 10. A frame 14 of the mining machine 10 is supported by a first track 18 and a second track 22. Shoes 26 are coupled together to form the first track 18 and the second track 22.

Figure 2:
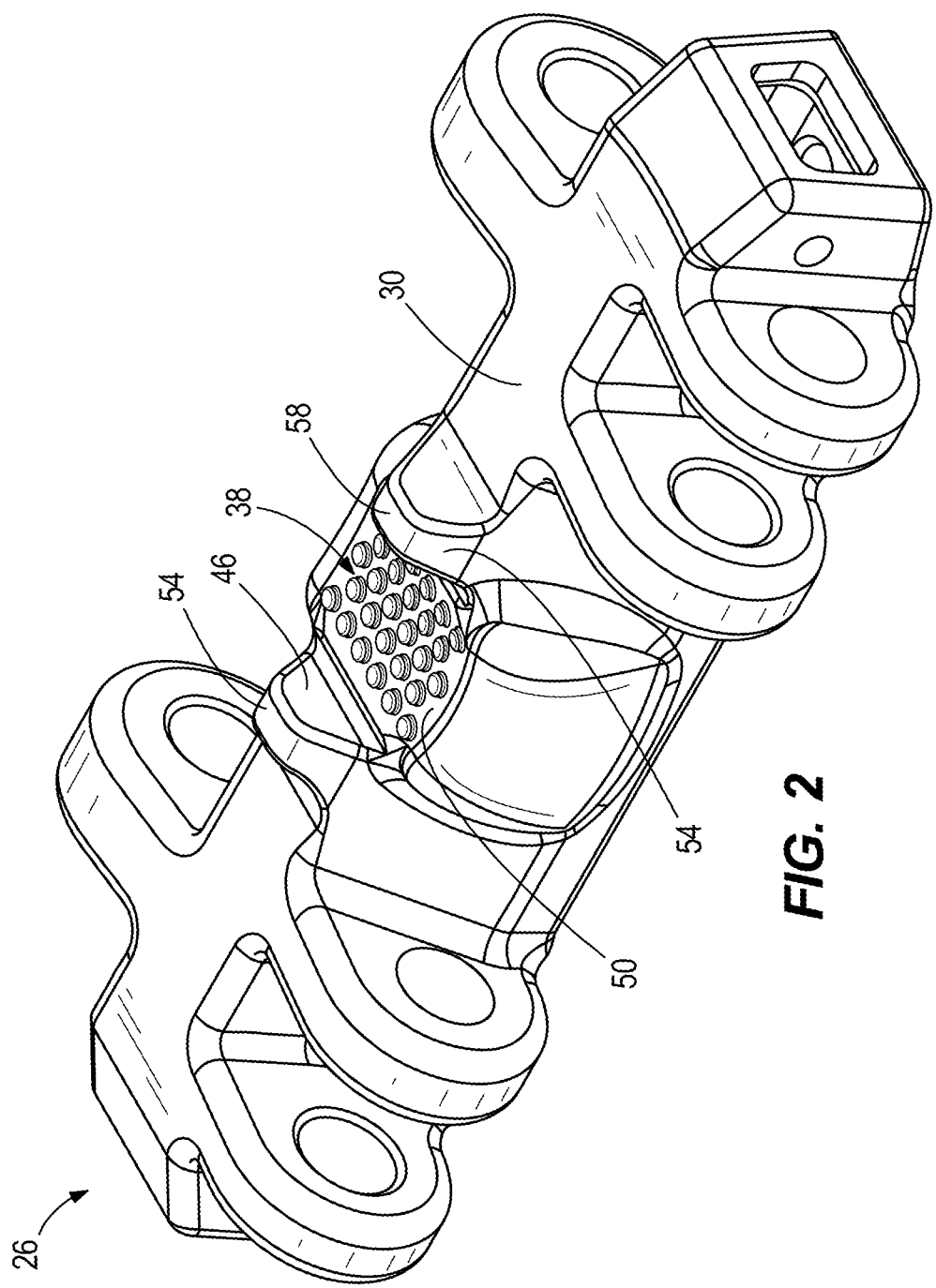
FIG. 2 is a perspective view of a shoe of the mining machine of FIG. 1.
Figure 4:
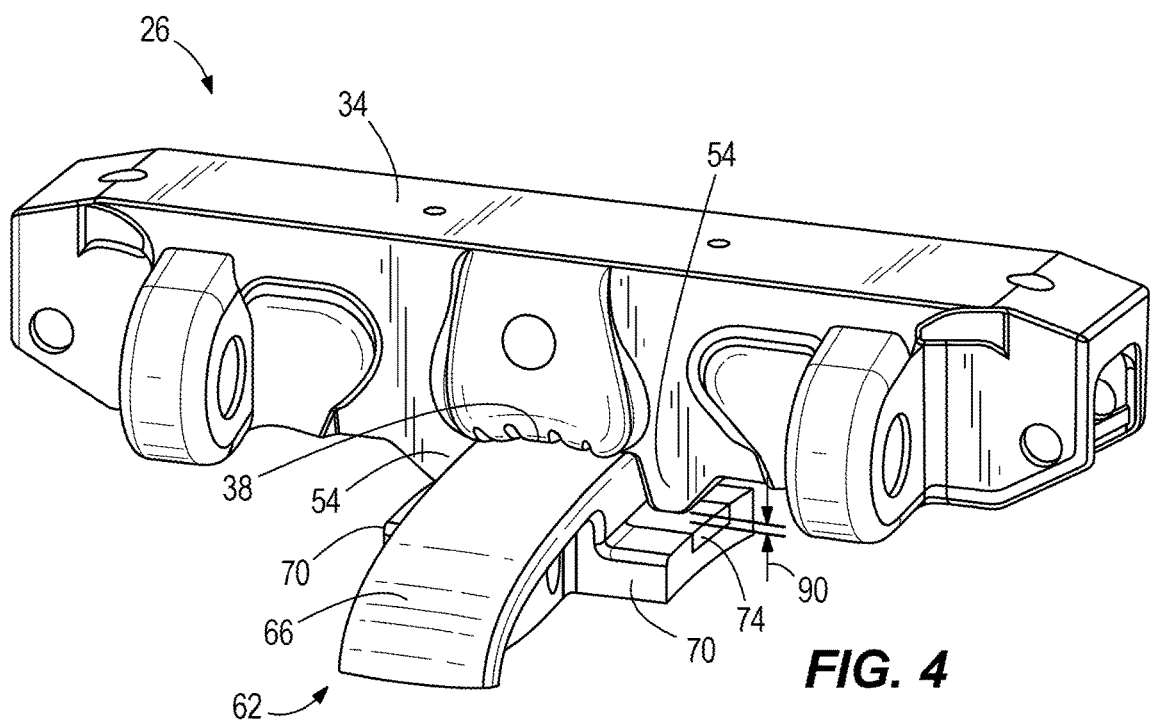
FIG. 4 is a perspective view of a guide rail received within a recessed area of the shoe of FIG. 2.

With reference to FIGS. 2 and 4, each shoe 26 includes a first or inner side 30 (FIG. 2) and a second or outer side 34 (FIG. 4). In the illustrated construction, the inner side 30 faces the frame 14 of the mining machine 10 and the outer side 34 faces away from the frame 14 and contacts the ground as the mining machine 10 propels. The outer side 34 includes a substantially flat surface, allowing the mining machine 10 to evenly traverse the ground. The inner side 30 includes a recessed area or shoe roller path 38.

With continued reference to FIG. 2, the shoe roller path 38 extends across a width of the inner side 30 of the shoe 26. The shoe roller path 38 includes two walls or side surfaces 46 (only one shown) and a lower surface 50. In the illustrated construction, the side surfaces 46 are substantially parallel to one another, and perpendicular to the inner side 30 of the shoe 26, although other constructions include different arrangements of side surfaces and a lower surface than that illustrated. In the illustrated construction, the lower surface 50 is curved between the side surfaces 46. The lower surface 50 is also curved along the width of the shoe 26 (e.g., in an orthogonal direction to the direction between the side surfaces 46).

The shoe 26 also includes drive lugs 54. The drive lugs 54 are positioned on either side of the shoe roller path 38. In the illustrated construction, the side surfaces 46 form a surface of each of the drive lugs 54 respectively. An upper surface 58 of the drive lug 54 is substantially flat (e.g., substantially parallel with the inner side 30). The drive lugs 54 may be made of any of a number of materials. In some constructions the drive lugs 54 are made at least partially from manganese or manganese steel. In some constructions the drive lugs 54 are made at least partially from Hadfield Manganese Steel (otherwise known as Austenitic Manganese Steel). The drive lugs 54 may include, for example, between 0.8% and 1.25% carbon and between 11% and 15% manganese. Other constructions include different values and ranges of values for carbon and manganese. In some constructions, the drive lugs 54 are made of materials other than carbon and/or manganese.

Figure 3:
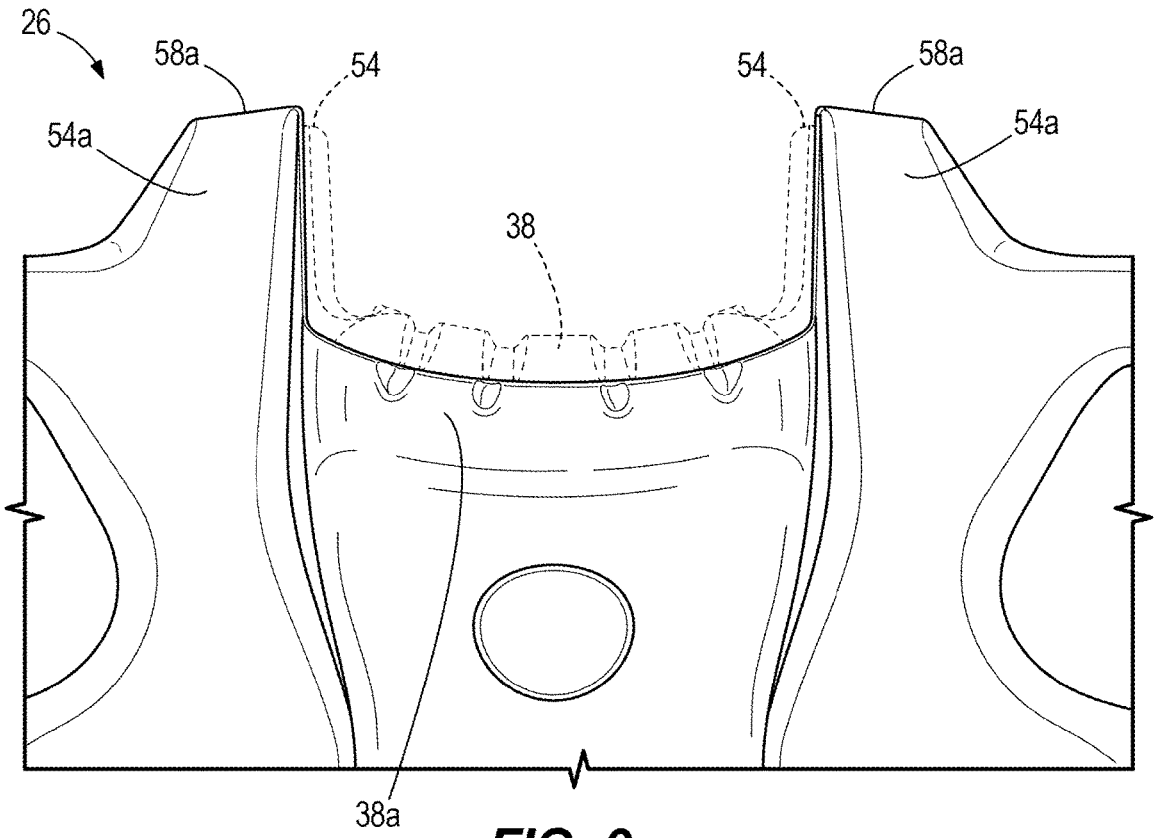
FIG. 3 is a front view of the shoe of FIG. 2, illustrating the shoe in a first position and a second position.

Over time, the weight of the mining machine 10 (FIG. 1) on the shoes 26 degrades (e.g., crushes) the shoe roller path 38. For example, with reference to FIG. 3, the original profile of the roller path and drive lugs are shown in dashed lines. As illustrated in FIG. 3, the shoe roller path 38 becomes deeper and wider as it experiences the weight of the mining machine 10 (represented by the shoe roller path 38*a* after being worn down). Additionally, the drive lugs 54 naturally grow vertically due to deformation processes (represented by the drive lugs 54*a* with upper surfaces 58*a* after use of the machine). A total displacement of the shoe 26 is equal to an amount that the shoe roller path 38 degrades plus an amount that the drive lugs 54 grow. The drive lugs 54 need to be trimmed and their length reduced so that the drive lugs 54 do not contact and damage the frame 14 and lower roller hubs (not shown).

With reference to FIG. 4, a guide rail 62 is received within the shoe roller path 38 of the shoe 26. The guide rail 62 is part of the frame 14 (FIG. 1) and moves through shoe roller paths 38 of successive shoes 26 as the prime mover propels the mining machine 10. The guide rail 62 includes a central portion 66 and two side portions (e.g.,wings) 70. The central portion 66 is curved along both its length and its width in a complementary manner to the shoe roller path 38 (i.e., the central portion 66 is convex and has generally the same radius of curvature as the concave shoe roller path 38). In the illustrated construction, the central portion 66 is hard-faced or overlayed to target predictable friction and wear between the central portion 66 of the guide rail 62 and the shoe roller path 38.

Figure 5:
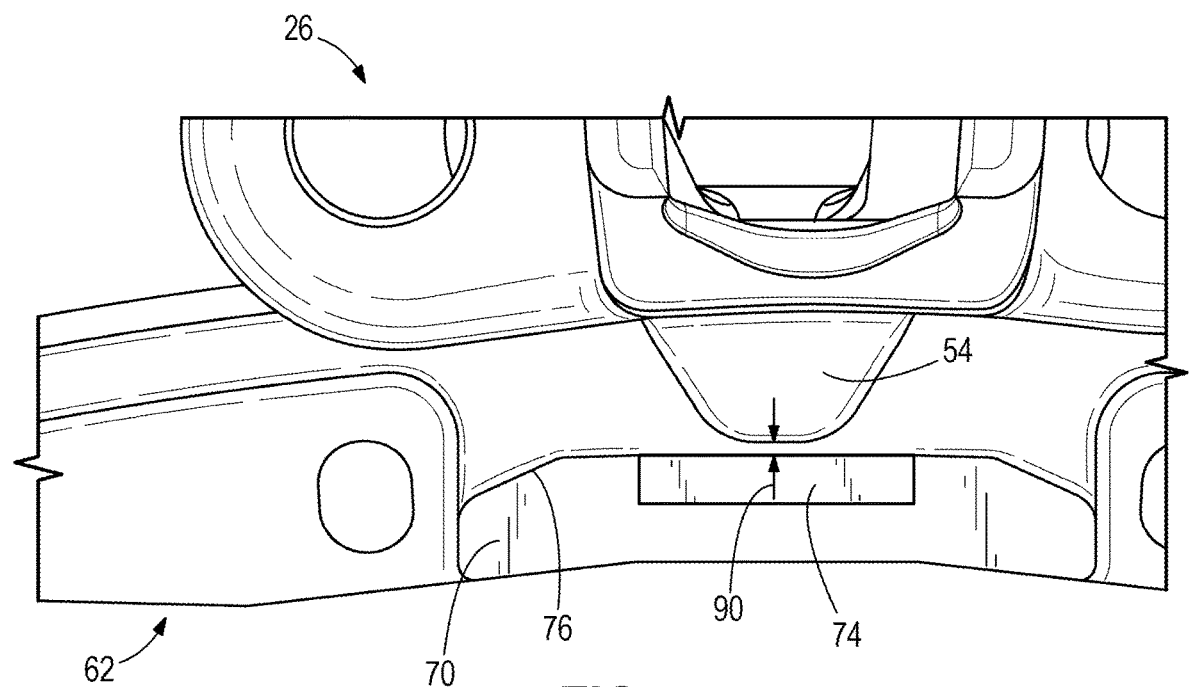
FIG. 5 is an enlarged view of the guide rail of FIG. 4 according to one construction.

The side portions 70 extend from sides of the central portion 66, in a direction generally orthogonal to the direction which the central portion 66 extends. Each wing 70 includes a cutting tool 74. The cutting tools 74 are disposed so that they align with the drive lugs 54 when the central portion 66 is received within the shoe roller path 38. In the illustrated construction, the cutting tool 74 is generally flush with the surface of the wing 70. In some constructions, the cutting tool 74 is formed with the wing 70, while in other constructions, the cutting tool 74 is coupled to the wing 70 (e.g., by fasteners). As illustrated in FIG. 5, in some constructions, the wing 70 includes a portion 76 that is angled in a direction parallel to the direction of the central portion 66. The angled portion 76 may provide a better lead in angle for the drive lug 54 as the drive lug 54 passes across the wing 70 to the cutting tool 74. A curved or radiused lead in may also accomplish the same benefits.

In some constructions, the cutting tool 74 (or tools 74) is not coupled to the side portion 70. For example, the cutting tool 74 may instead be coupled to the central portion 66 of the guide rail 62, at a location that still enables the cutting tool 74 to contact and abrade drive lug 54. In yet other constructions, the cutting tool 74 is not coupled at all to the guide rail 62. Rather, the cutting tool 74 is coupled to another area of the frame 14 (e.g., adjacent the guide rail 62), at a location that still enables the cutting tool 74 to contact and abrade the drive lug 54.

In some constructions, the cutting tool 74 is releasably coupled to the frame 14 (e.g., to the guide rail 62 or to another area of the frame 14) via a fastener (e.g., a bolted or other structure), or via another mechanical structure. In some constructions the frame 14 may include a shear ledge or ledges, to facilitate mechanical coupling and/or alignment of the cutting tool 74 to the frame 14, and/or to provide support for the cutting tool 74. Overall, it may be desirable to remove, replace, and/or add cutting tool(s) 74 at multiple points during the life of the tracks on the mining machine 14, depending on the relative condition of different components in the lower works of the mining machine 14 (e.g. the guide rails 62, rollers, idlers, or shoes 26). Releasably coupling the tools 74 facilitates this type of maintenance.

In some constructions, the cutting tool 74 is instead permanently coupled to the frame 14 (e.g., to the guide rail 62 or to another area of the frame 14). For example, the cutting tool 74 maybe welded, or fused, directly to the frame 14. In yet other constructions, the cutting tool 74 is integrally formed as a single piece with the frame 14 (e.g., cast during a manufacturing process).

The cutting tool 74 may include any of a number of materials. For example, in some constructions the cutting tool 74 is made at least in part of tool steel. In some embodiments the cutting tool 74 is made at least in part of a standard low alloy steel to cut the manganese (or other material) off of the drive lug 54. In some constructions, the material of the cutting tool 74 is similar to or identical to the material of the guide rail 62 itself and/or another portion of the frame 14. In some constructions, the cutting tool 74 is made at least in part of a carbide or technical ceramic cutting tool. Alternatively, the cutting tool 74 may be made for example from a highly-durable abrasive material (e.g., aluminum oxide or boron nitride) that is able to abrasively remove the manganese (or other material) from the drive lugs 54. In some constructions, and as described above, the cutting tool 74 is applied directly to the finished wing 70 of the guide rail 62 (e.g., integrally formed as a single piece with the wing 70). In yet other constructions, the cutting tool 74 is separate, and is mechanically attached to the guide rail 62. In some constructions, the material of the cutting tool 74 may be made, for example, by Plasma Transfer Arc (PTA), laser cladding, High Velocity Oxygen Fuel (HVOF) spray, electroplating, MIG welding (hard facing with traditional MIG welding techniques), sintering & hot pressing, selective melting processing (via electron beam), abrasive particle suspension in a substrate (i.e. abrasive particles suspended in a casting or resin/fiberglass body, much like a grinding disk), or abrasive attachment via brazing.

Figure 6:
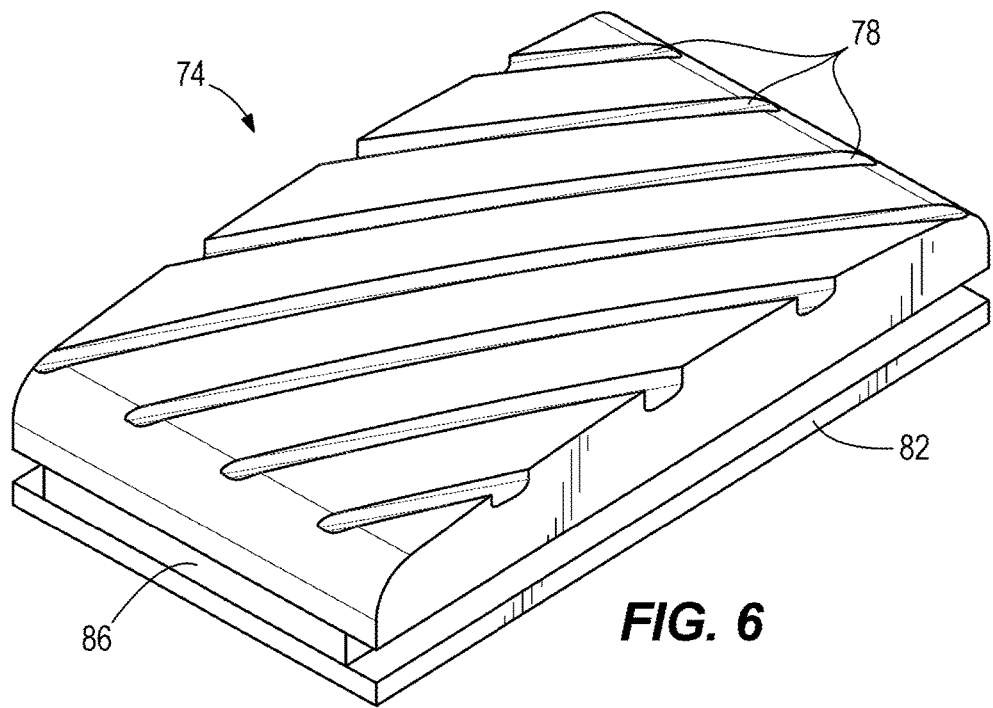
FIG. 6 is a perspective view of a cutting tool of the guide rail of FIG. 4.

As illustrated in FIG. 6, in the illustrated construction, the cutting tool 74 is generally rectangular in shape, and includes a hatch pattern 78 on an outer surface. The hatch pattern 78 includes channels that help direct debris (e.g., cut manganese) away from the cutting tool 74 so that the cutting tool 74 remains generally clean (i.e., the outer surface is free of debris so that the cutting tool 74 can continue to make cuts into the drive lugs 54). The channels of the hatch pattern 78 also create edges on the outer surface of the cutting tool 74. The edges provide additional cutting surfaces and assist in removing more material. In other constructions, the cutting tool 74 has other shapes and sizes than that illustrated, as well as other hatch patterns 78. In some constructions the cutting tool 74 does not include a hatch pattern 78.

In the illustrated construction, a backing plate 82 and a backer 86 are mounted to the guide rail 62 (FIG. 4) between the wing 70 (FIG. 4) and the cutting tool 74. The backing plate 82 is made of steel, and contacts the wing 70 directly, although other constructions include different materials. The backing plate 82 may have shear ledges to provide support for shearing forces. In the illustrated construction, the backer 86 is made of urethane, and is sandwiched between the cutting tool 74 and the backing plate 82. The backer 86 is used to bias or spring load the cutting tool 74 (e.g., away from the backing plate 82). Spring loading the cutting tool 74 may prevent overloads on the outer surface of the cutting tool 74 by allowing the cutting tool 74 to bias out of the way in the event of an excessive overload. Other constructions do not include a backing plate 82 and/or backer 86.

Figure 7A:
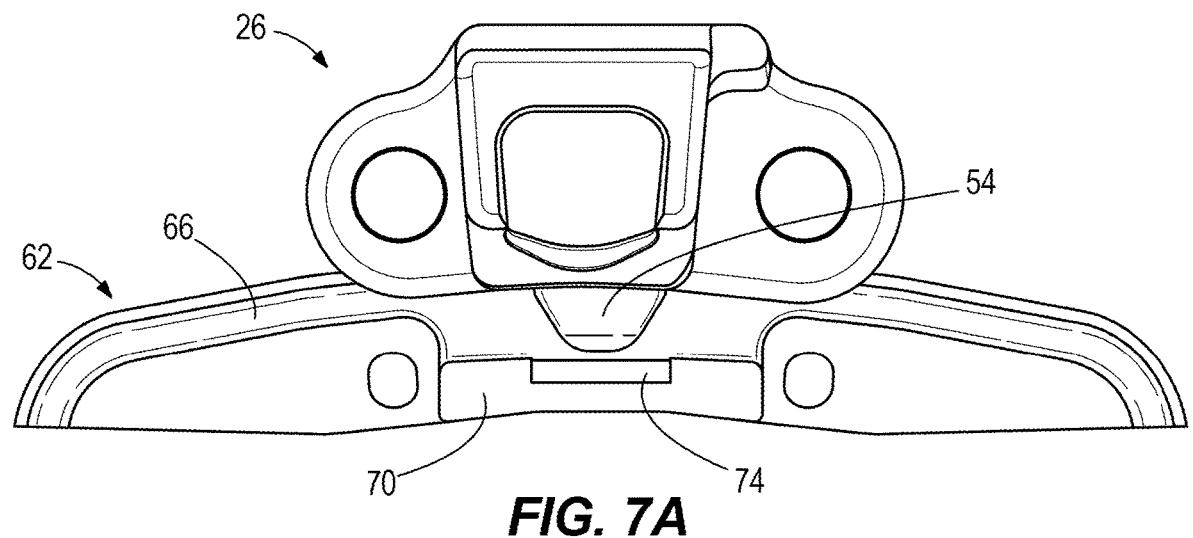
FIG. 7a is a side view of the guide rail and the shoe of FIG. 4 is a first position.
Figure 7B:
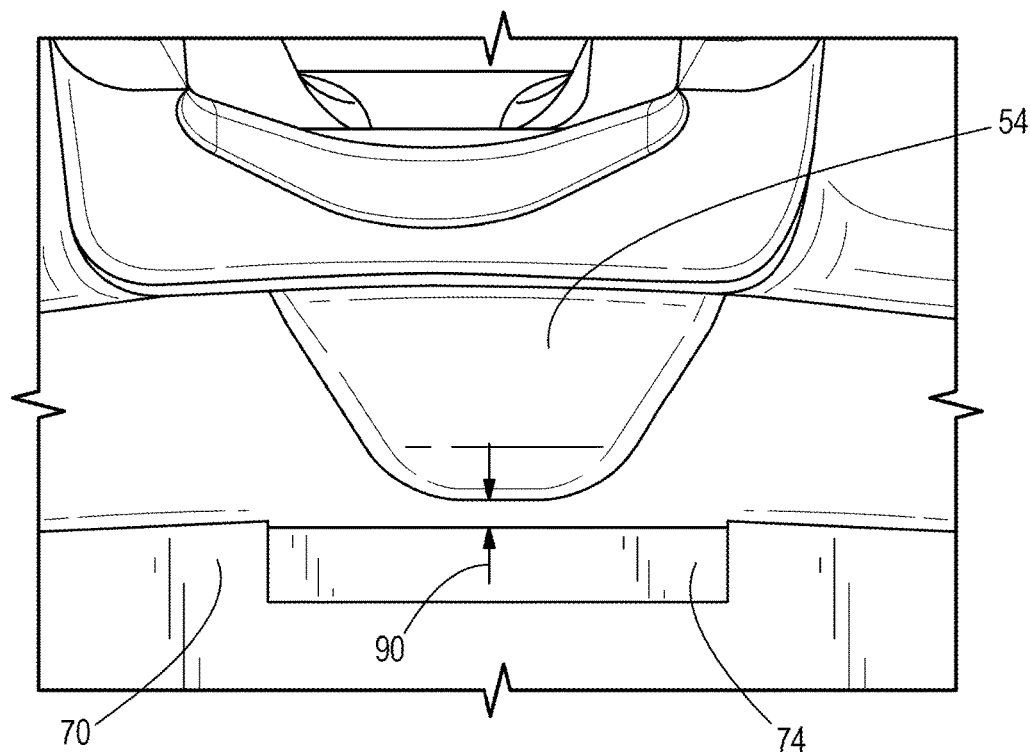
Figure 8A:
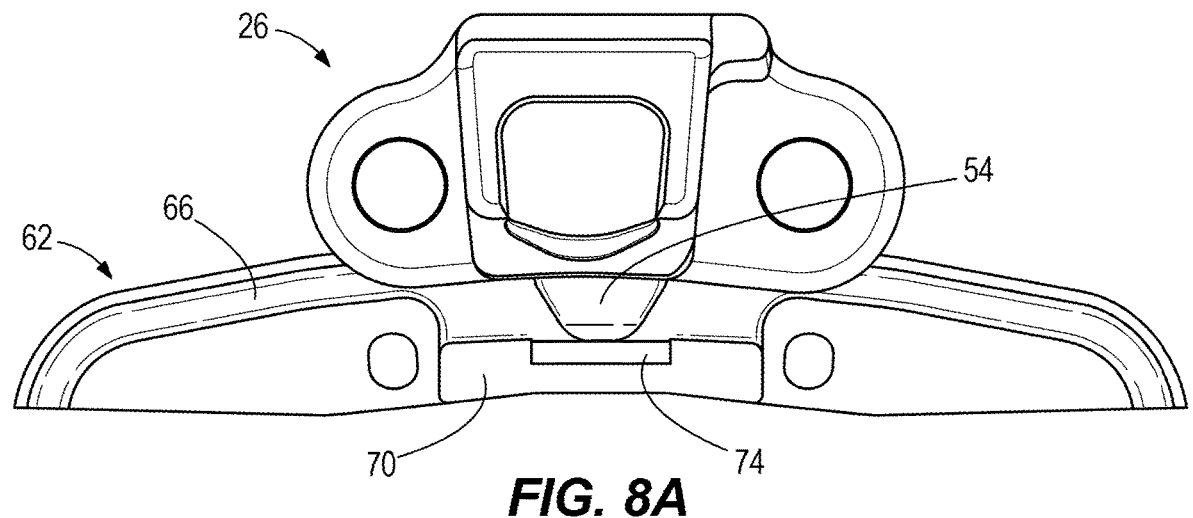
FIG. 8a is a side view of the guide rail and the shoe of FIG. 4 is the second position.
Figure 8B:
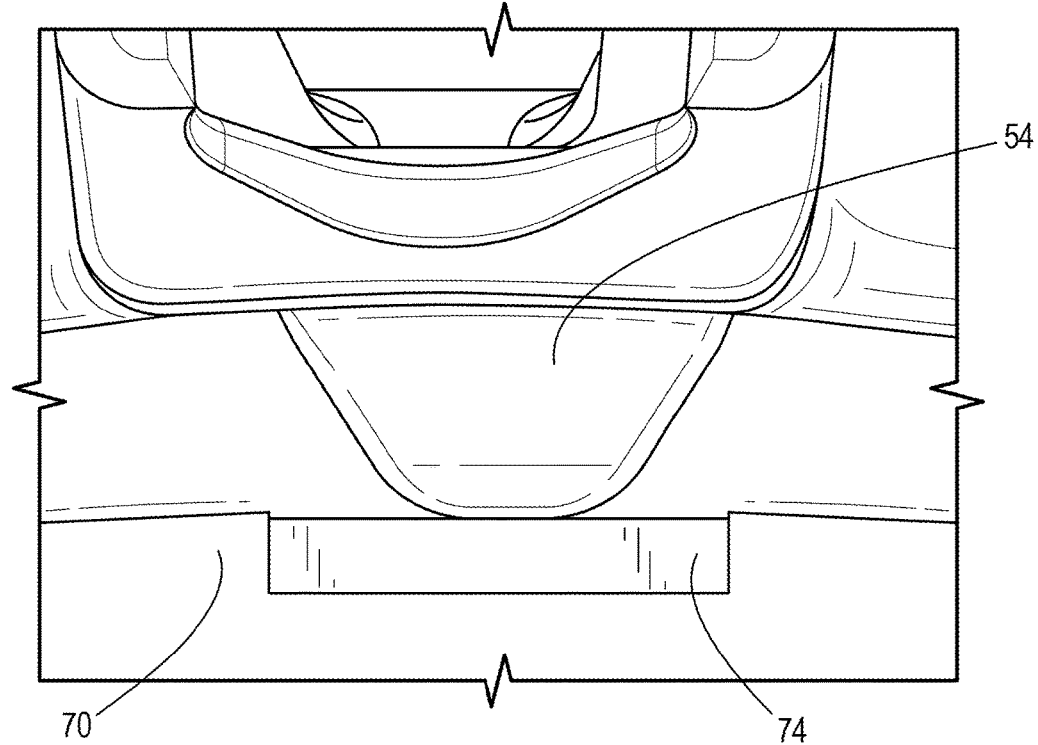
Figure 9A:
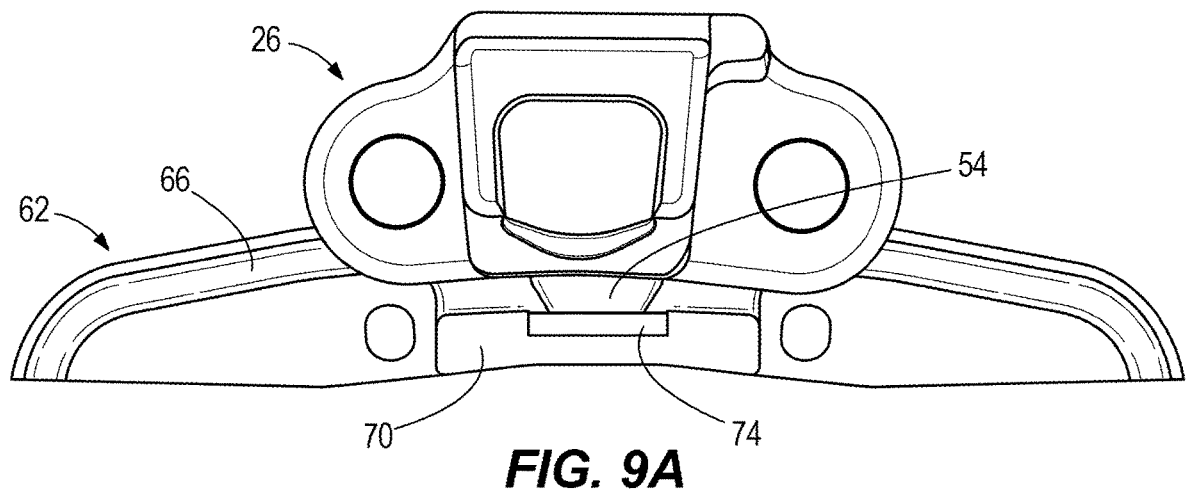
FIG. 9a is a side view of the guide rail and the shoe of FIG. 4 is a third position.
Figure 9B:
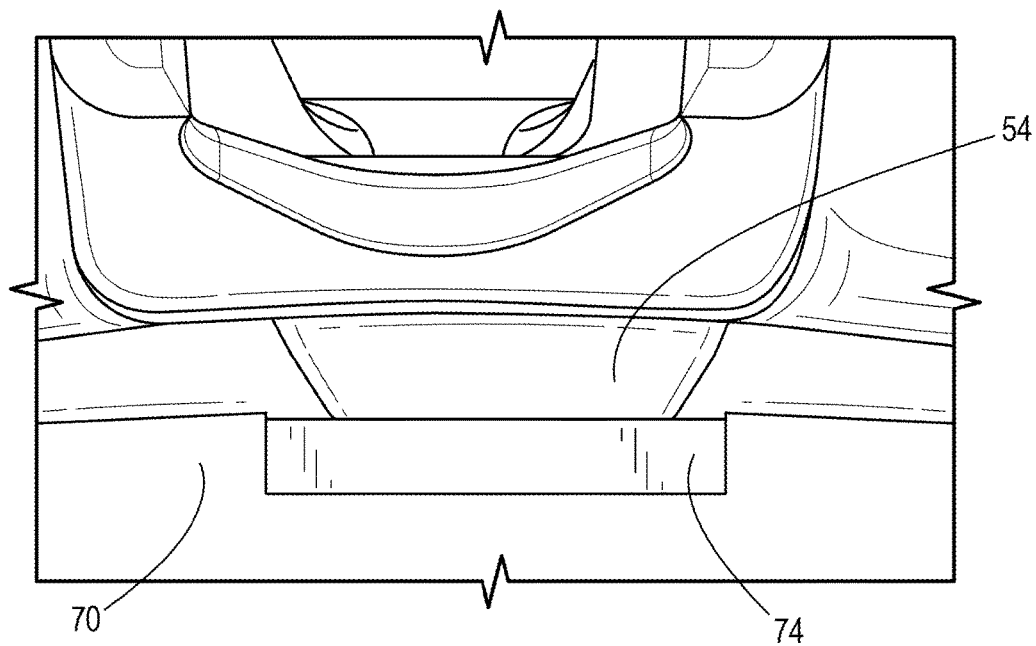

As illustrated in FIGS. 4 and 7b, in some constructions a gap 90 exists between the drive lugs 54 and the side portions 70 when the shoes 26 of the mining machine 10 are new and in a first or non-degraded position. There is almost zero or zero contacting pressure between the cutting tool 74 and the drive lugs 54. As the mining machine 10 moves, there is only contact between the shoe roller path 38 and the central portion 66 of the guide rail 62.

As illustrated in FIGS. 8a-9b, a deeper shoe roller path 38a reduces a clearance between the side portions 70 and the drive lugs 54. As the mining machine 10 moves, contact is shared between the guide rail 62 and shoe roller path 38a, and the drive lugs 54 and the cutting tools 74. There is also a high contact pressure between the drive lugs 54 and the cutting tools 74.

The shoe roller path 38 degrades and the drive lugs 54 grow gradually over the course of using the mining machine 10 (e.g., the degradation process may take several thousand hours). The drive lugs 54 gradually come into contact with the cutting tools 74 as the gap 90 is reduced. A small, controlled amount of material is removed (e.g., via friction) from the drive lugs 54 every time they pass over the cutting tools 74. The amount of material trimmed from the drive lugs 54 depends on the amount that the shoe roller path 38 has been degraded (e.g., more material would be removed the more the shoe roller path 38 has been degraded). As material from the drive lugs 54 is abraded, the contact pressure between the drive lugs 54 and the cutting tool 74 is reduced, and the gap 90 may return.

The cutting tools 74 allow the drive lugs 54 to be trimmed maintenance free. While the mining machine 10 moves, material is continuously trimmed off of the drive lugs 54 so that the drive lugs 54 do not grow to an excessive length. The tracks 18, 22 do not need to be split so that the drive lugs 54 can be manually trimmed down. This saves money on maintenance costs and allows the mining machine 10 to continue to operate without the need for down time caused by service on the drive lugs 54.

FIGS. 10-16 illustrate other exemplary constructions of cutting tools that may be coupled to the frame 14 (e.g., to a guide rail or other component of the frame 14). Similar to the cutting tool 70 described above, the cutting tools in FIGS. 10-16 also abrade the drive lugs 54, and may have at least some of the same features and advantages as those described above for the guide rail 62 and cutting tool 70.

Figure 10:
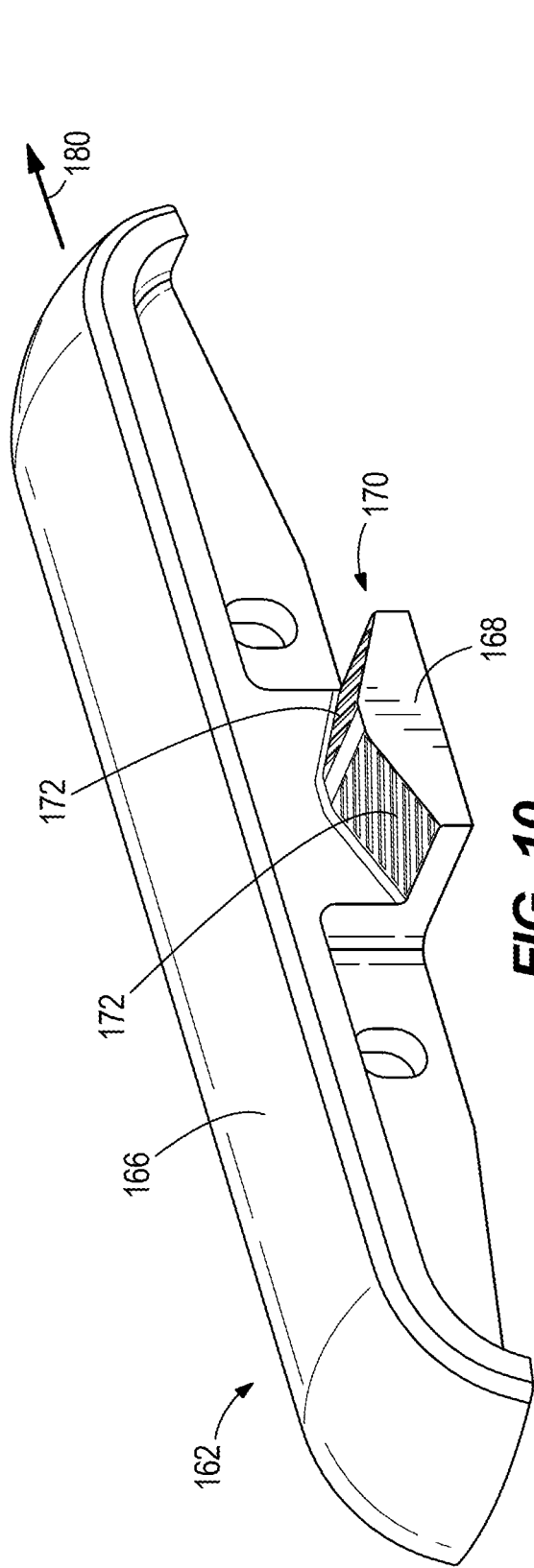
FIG. 10 is a partial view of a guide rail according to another construction, having an integrally-formed cutting tool with a hatched cutting face with angled lead.

FIG. 10 illustrates a guide rail 162 for the frame 14. The guide rail 162 has an integrally-formed cutting tool 170 with hatched cutting faces 172 and an angled lead. As seen in FIG. 10, the cutting tool 170 is integrally formed as a single piece with (e.g., cast during a manufacturing process) the guide rail 162. The guide rail 162 includes a central portion 166 and at least one side portion 168. The cutting tool 170 is formed as part of the side portion 168, although as noted above in other constructions the cutting tool 170 may instead be formed as part of or otherwise coupled to a different area of the guide rail 162 or the frame 14. In some constructions two side portions 168 are provided on opposite sides of the central portion 166, each having its own cutting tool 170. In the illustrated construction, the central portion 166 extends along a longitudinal direction 180. The cutting faces 172 of the cutting tool 170 are generally planar and each extend at an angle of between 40-50 degrees relative to the longitudinal direction 180. Other constructions include different angles or ranges of angles for the cutting faces 172, as well as different shapes than that illustrated for the cutting tool 170 and cutting faces 172. In some constructions only a single cutting face 172 is provided on the cutting tool 170, or more than two faces 172 are provided.

Figure 11:
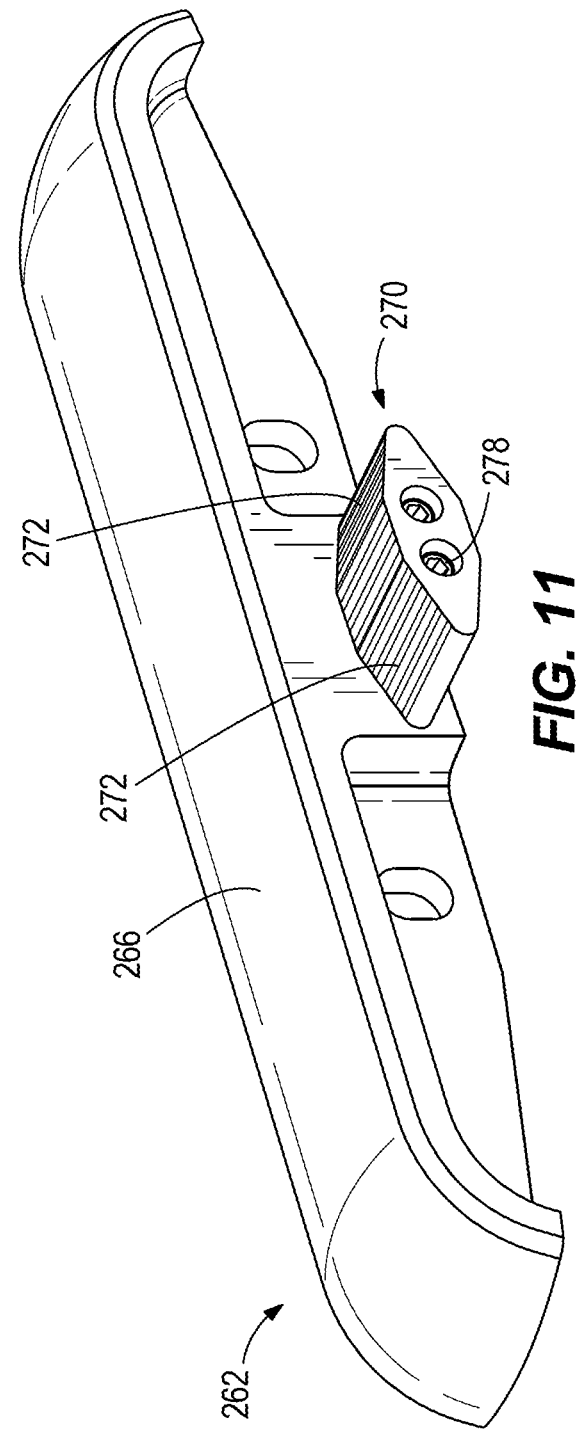
FIG. 11 is a partial view of a guide rail according to another construction, having a mechanically-attached cutting tool with a fluted cutting face with angled lead.

FIG. 11 is a partial view of a guide rail 262 for the frame 14. The guide rail 262 has a mechanically-attached cutting tool 270 with fluted cutting faces 272 and an angled lead. As seen in FIG. 11, the cutting tool 270 is a separate component that is mechanically, and releasably, coupled to the guide rail 262 with one or more bolts 278 or other fasteners. In some constructions the cutting tool 270 is made of a material different than the guide rail 262. As illustrated in FIG. 11, the guide rail 262 includes a central portion 266. The cutting tool 270 is coupled directly to the central portion 266, although as noted above in other constructions the cutting tool 270 could instead be formed as part of or otherwise coupled to a different area of the guide rail 262 or the frame 14. In some constructions another similar cutting tool 270 is coupled to an opposite side of the central portion 266. Other constructions also include different shapes and sizes for the cutting tools 270 than that illustrated.

Figure 12:
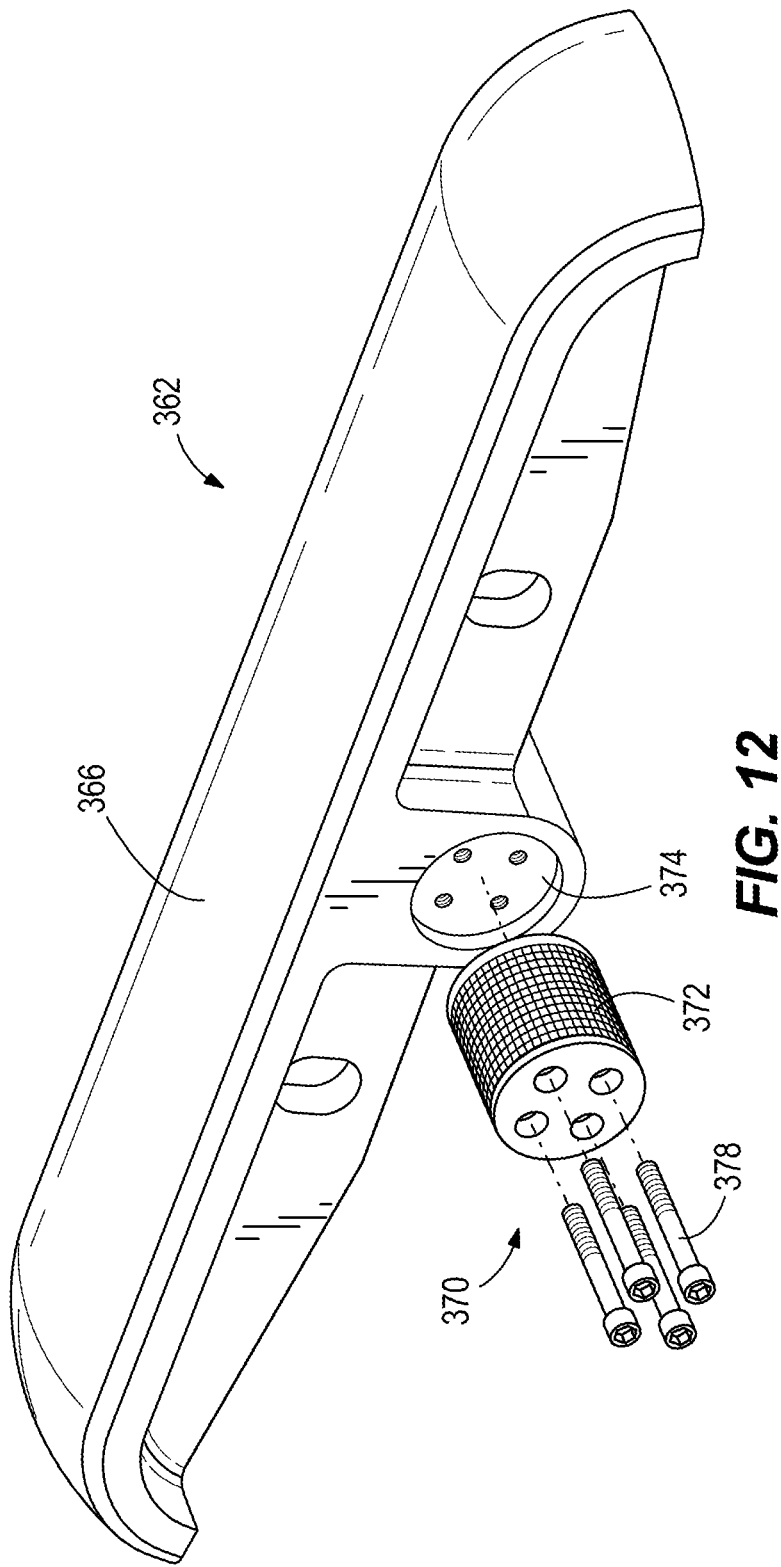
FIG. 12 is a partial view of a guide rail according to another construction, having a mechanically-attached cutting tool with a knurled cutting face with radiused lead, and piloted shear ledge.

FIG. 12 is a partial view of a guide rail 362 for the frame 14. The guide rail 362 has a mechanically-attached cutting tool 370. The cutting tool 370 has a knurled cutting face 372 with a radiused lead, and the guide rail 362 includes a piloted shear ledge 374 shaped to receive a portion of the cutting tool 370. The shear ledge 374 provides support for the cutting tool 370. At least one bolt 378 or other fastener extend through the cutting tool 370 to releasably fasten the cutting tool 370 to the guide rail 362. The guide rail 362 includes a central portion 366. The cutting tool 370 is coupled to the central portion 366, although as noted above in other constructions the cutting tool 370 could instead be formed as part of or otherwise coupled to a different area of the guide rail 362 or the frame 14. In some constructions another similar cutting tool 370 is coupled to an opposite side of the central portion 366. Other constructions also include different shapes and sizes for the cutting tools 370 than that illustrated.

Figure 13:
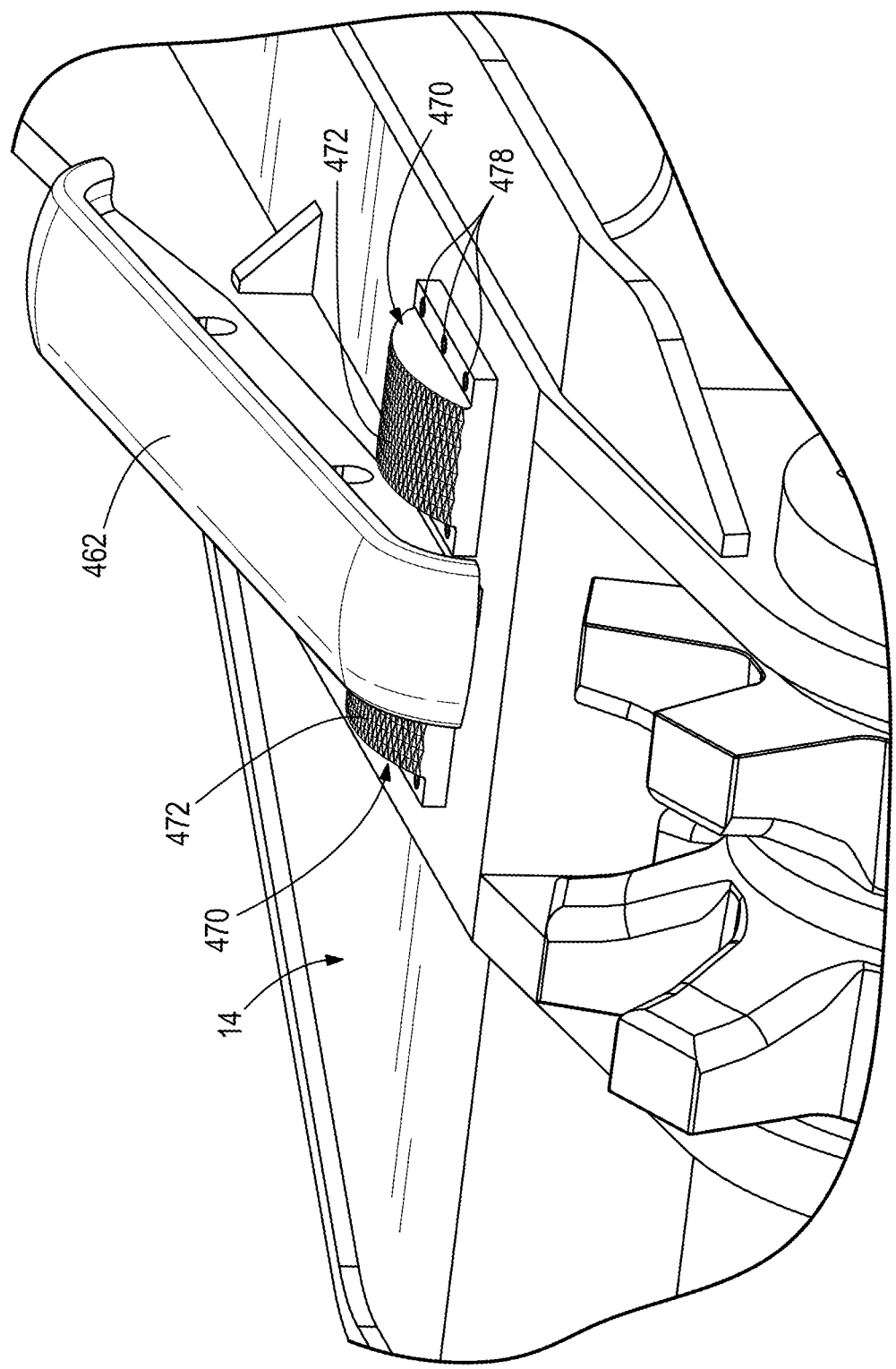
FIGS. 13-17 illustrate additional constructions of cutting tools that are positioned on one or more regions of the frame other than the guide rail.
Figure 14:
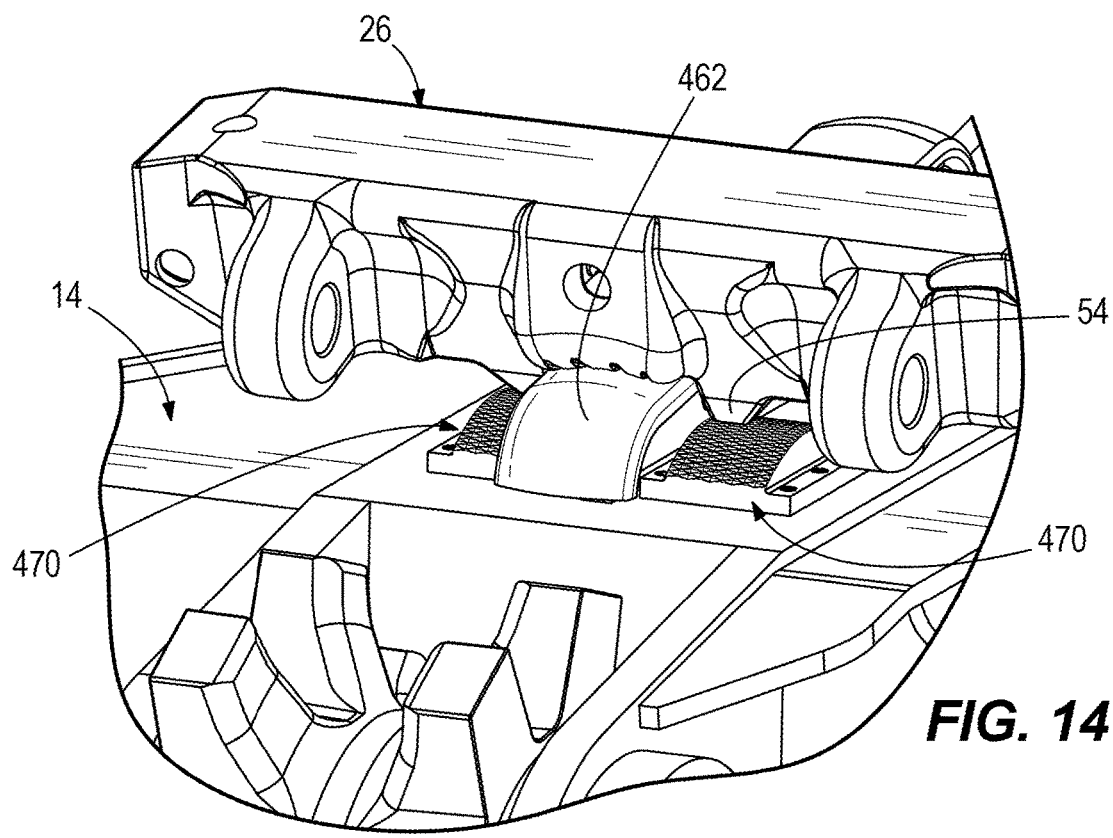
Figure 15:
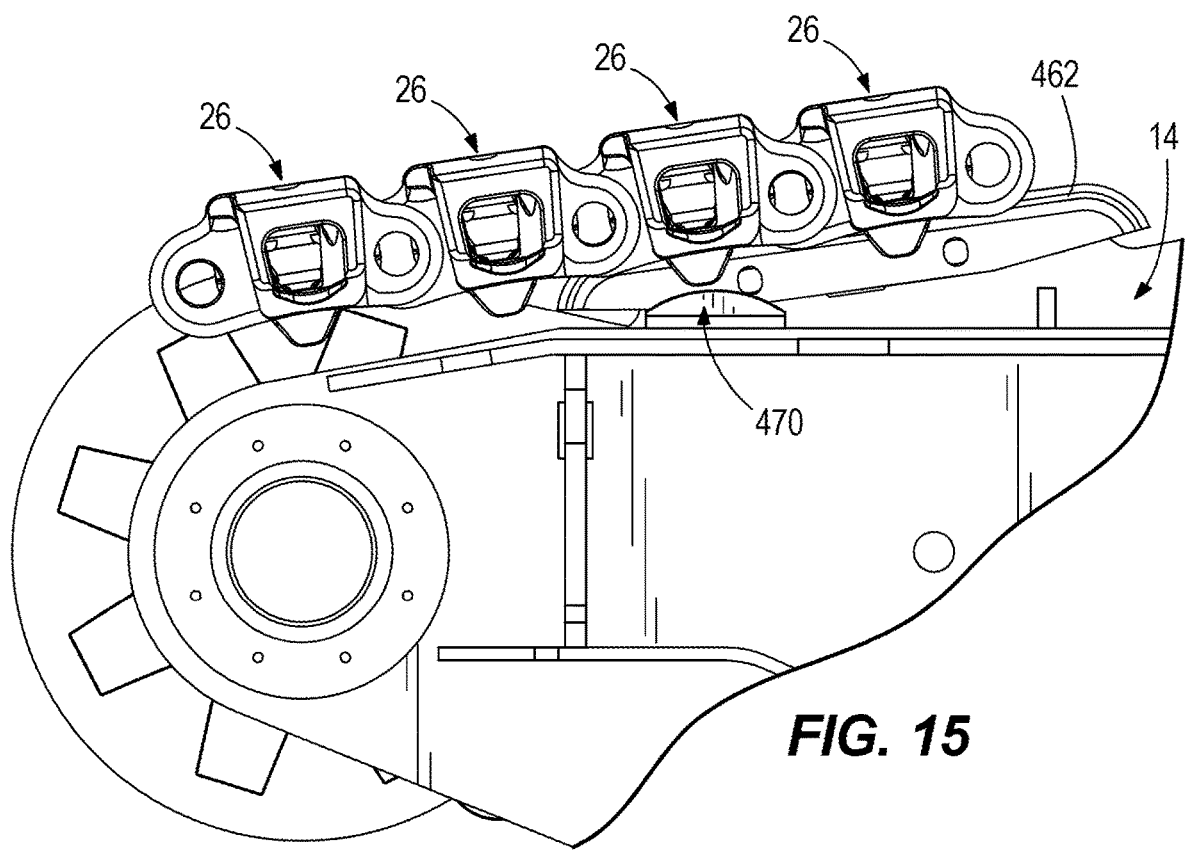
Figure 17:
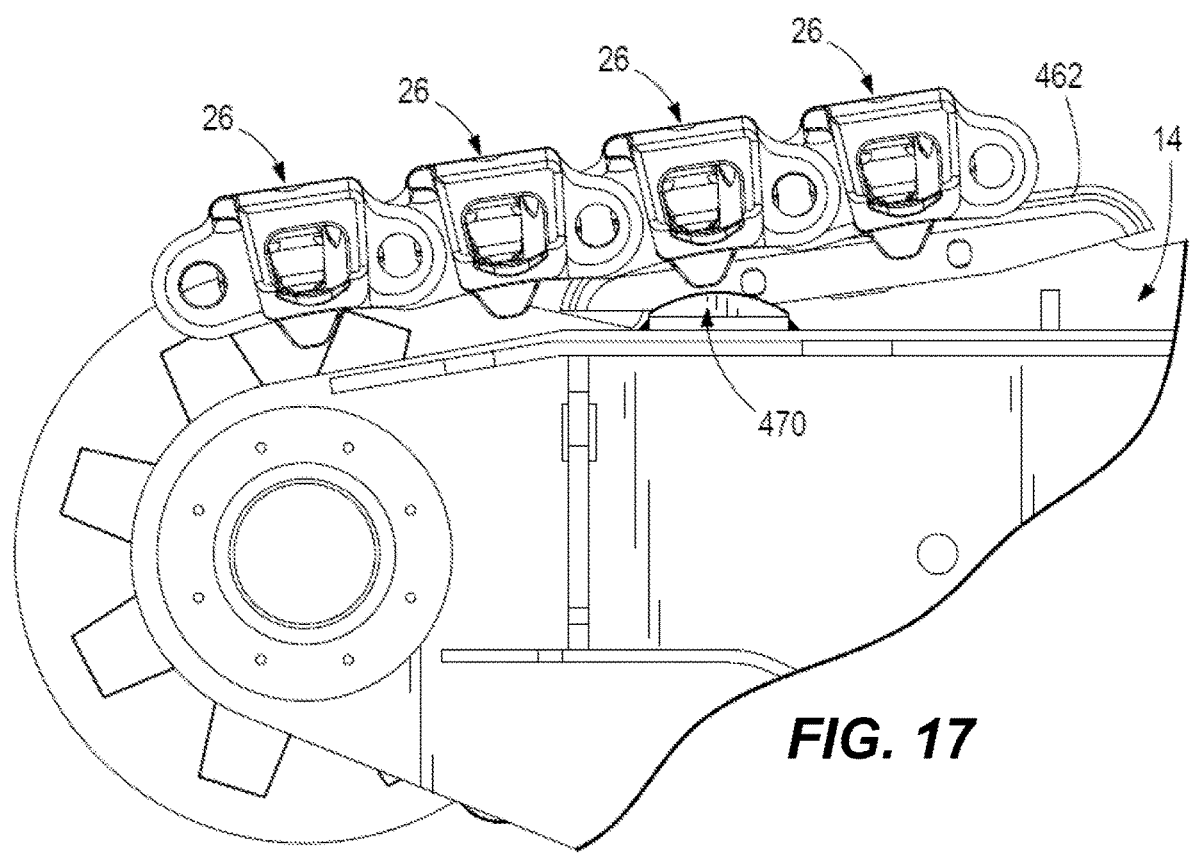

FIGS. 13-15 illustrate a rear guide rail 462 coupled to the frame 14, and cutting tools 470 that are separately coupled to the frame 14 adjacent the rear guide rail 462 (e.g., on opposite sides of the rear guide rail 462). The cutting tools 470 are mechanically coupled to the frame 14 with bolts 478 or other fasteners that extend through the cutting tools 470 to releasably fasten the cutting tools 470 to the frame 14, although in other constructions (see e.g., FIG. 17) the cutting tools 470 are integrally formed as a single piece with the frame 14 (e.g., integrally cast), or are otherwise permanently coupled to the frame 14 (e.g., via welding). The illustrated cutting tools 470 include knurled cutting faces 472, although other constructions include hatched or fluted cutting faces or other cutting faces that facilitate cutting. In some constructions, the cutting tools 470 include angled leads, similar to the cutting tools 170 or 270. As illustrated in FIGS. 14 and 15, when the mining machine 10 moves, the shoes 26 pass over the rear guide rail 462, and material is continuously trimmed off of the drive lugs 54 of the shoes 26 so that the drive lugs 54 do not grow to an excessive length.

Figure 16:
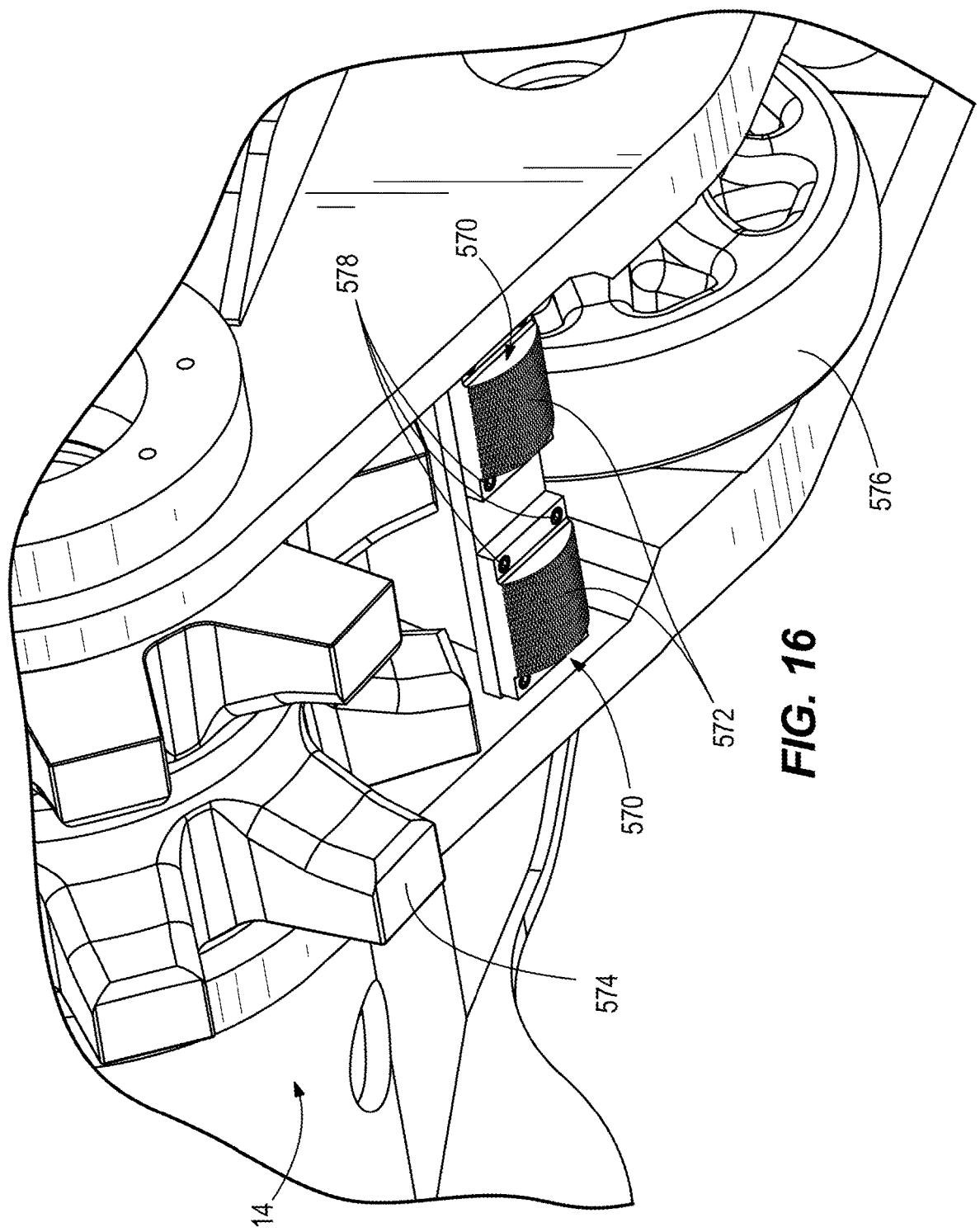

FIG. 16 illustrates cutting tools 570 that are mechanically attached to an underside of the frame 14, between a tumbler 574 and a rear idler 576. The cutting tools 570 are mechanically coupled to the frame 14 with bolts 578 or other fasteners that extend through the cutting tools 570 to releasably fasten the cutting tools 570 to the frame 14, although in other constructions the cutting tools 570 are integrally formed as a single piece with the frame 14 (e.g., integrally cast), or are otherwise permanently coupled to the frame 14 (e.g., via welding). The illustrated cutting tools 570 include knurled cutting faces 572, although other constructions include hatched or fluted cutting faces or other cutting faces that facilitate cutting. In some constructions, the cutting tools 570 include angled leads, similar to the cutting tools 170 or 270.

Although various constructions have been described in detail with reference to certain examples illustrated in the drawings, variations and modifications exist within the scope and spirit of one or more independent aspects described and illustrated.

The invention claimed is:

1. A mining machine comprising:
    a frame;
    a shoe having a recessed area that defines a roller path, the shoe further having a drive lug; and
    a cutting tool coupled to the frame and positioned such that the cutting tool is configured to abrasively remove material from the drive lug as the drive lug passes by the cutting tool,
    wherein the frame includes a guide rail having a central portion configured to be disposed within the recessed area, wherein the guide rail has a side portion extending from the central portion, wherein the cutting tool is coupled to the side portion.

2. The mining machine of claim 1, wherein the side portion is a first side portion and the cutting tool is a first cutting tool, wherein the guide rail includes a second side portion positioned opposite the first side portion, and a second cutting tool is coupled to the second side portion.

3. The mining machine of claim 1, wherein the recessed area is configured to become deeper and wider as a result of a weight force of the mining machine, and wherein a gap between the side portion of the guide rail and the shoe is configured to be reduced as the recessed area becomes deeper and wider.

4. The mining machine of claim 1, wherein the cutting tool includes a hatch pattern along an outer surface of the cutting tool, wherein the hatch pattern includes channels configured to directly remove material away from the side portion.

5. The mining machine of claim 1, wherein the cutting tool includes a hatch pattern along an outer surface of the cutting tool.

6. The mining machine of claim 1, wherein the cutting tool is comprised of tool steel.

7. The mining machine of claim 1, wherein the frame includes a guide rail having a central portion configured to be disposed within the recessed area, wherein the central portion has a convex outer surface.

8. The mining machine of claim 1, wherein the cutting tool is removably coupled to the frame.

9. The mining machine of claim 1, wherein the drive lug is comprised of austenitic manganese steel.

10. The mining machine of claim 1, wherein the cutting tool is permanently fixed to the frame.

11. A guide rail for a frame of a mining machine, the guide rail comprising:
    a central portion having a convex outer surface;
    a side portion extending from the central portion; and
    a cutting tool coupled to the side portion;
    wherein the cutting tool is configured to abrasively remove material from a drive lug of a shoe as the shoe moves along the guide rail.

12. The guide rail of claim 11, wherein the cutting tool includes a hatch pattern along an outer surface of the cutting tool, wherein the hatch pattern includes channels configured to directly remove material away from the side portion.

13. The guide rail of claim 11, wherein the cutting tool is comprised of tool steel.

14. The guide rail of claim 11, wherein the side portion is a first side portion and the cutting tool is a first cutting tool, wherein the guide rail includes a second side portion positioned opposite the first side portion, and a second cutting tool is coupled to the second side portion.

15. The guide rail of claim 11, wherein the cutting tool is removably coupled to the side portion.

16. The guide rail of claim 11, wherein the cutting tool is integrally formed as a single piece with the side portion.

17. The guide rail of claim 11, wherein the cutting tool is welded to the side portion.

18. A cutting tool configured to be coupled to a frame of a mining machine, the cutting tool comprising a surface configured to abrasively remove material from a drive lug of a shoe as the shoe moves along the frame, the cutting tool further comprising the frame, wherein the cutting tool is integrally formed as a single piece with the frame.

19. The cutting tool of claim 18, wherein the surface is a hatched cutting face with channels configured to remove debris.

20. A mining machine comprising:
    a frame including a guide rail;
    a shoe having a recessed area that defines a roller path, the shoe further having a drive lug;
    a cutting tool coupled to the frame and positioned such that the cutting tool is configured to abrasively remove material from the drive lug as the drive lug passes by the cutting tool, the cutting tool being coupled to a portion of the frame that is separate from the guide rail.

21. The mining machine of claim 20, wherein the cutting tool includes a hatch pattern along an outer surface of the cutting tool.

22. The mining machine of claim 20, wherein the cutting tool is comprised of tool steel.

23. The mining machine of claim 20, wherein the guide rail include a central portion configured to be disposed within the recessed area, wherein the central portion has a convex outer surface.

24. The mining machine of claim 20, wherein the cutting tool is removably coupled to the frame.

25. The mining machine of claim 20, wherein the drive lug is comprised of austenitic manganese steel.

26. The mining machine of claim 20, wherein the cutting tool is permanently fixed to the frame.

27. A guide rail for a frame of a mining machine, the guide rail comprising:
- a central portion;
- a side portion extending from the central portion; and
- a cutting tool removably coupled to the side portion;
- wherein the cutting tool is configured to abrasively remove material from a drive lug of a shoe as the shoe moves along the guide rail.

28. The guide rail of claim 27, wherein the cutting tool includes a hatch pattern along an outer surface of the cutting tool, wherein the hatch pattern includes channels configured to directly remove material away from the side portion.

29. The guide rail of claim 27, wherein the cutting tool is comprised of tool steel.

30. The guide rail of claim 27, wherein the side portion is a first side portion and the cutting tool is a first cutting tool, wherein the guide rail includes a second side portion positioned opposite the first side portion, and a second cutting tool is coupled to the second side portion.

\* \* \* \* \*